Jan. 5, 1960
L. SPRARAGEN
2,919,602
PROTECTIVE KNOB UNIT
Filed Oct. 2, 1958
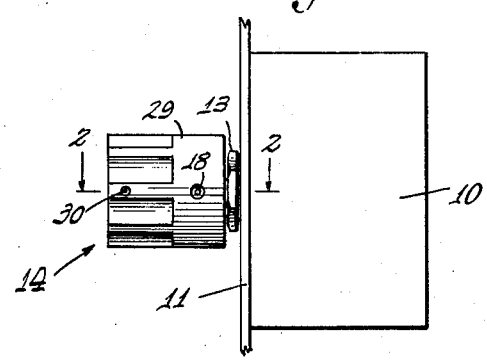
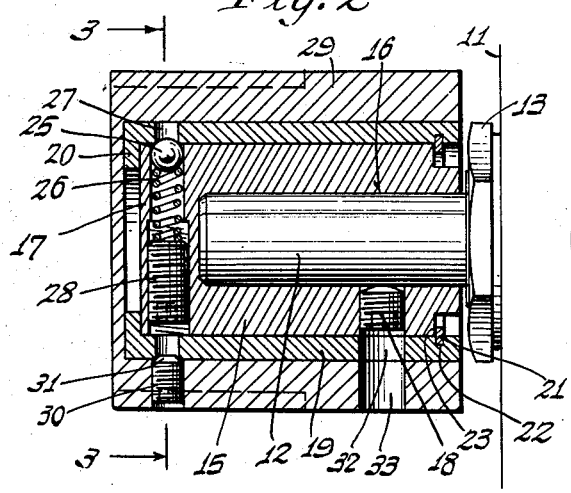 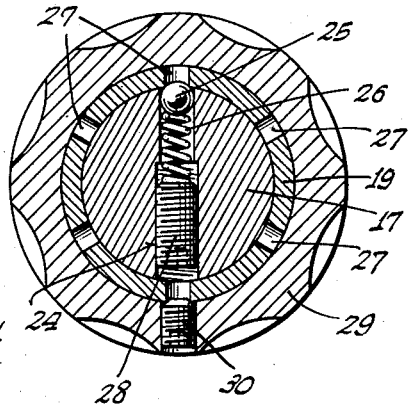
INVENTOR.
Louis Spraragen
BY
Johnson and Kline
ATTORNEYS

United States Patent Office 2,919,602
Patented Jan. 5, 1960

2,919,602

PROTECTIVE KNOB UNIT

Louis Spraragen, Fairfield, Conn., assignor to Automatic Locking Devices, Inc., Bridgeport, Conn., a corporation of Connecticut Application October 2, 1958, Serial No. 764,828

4 Claims. (Cl. 74—553)

The present invention relates to a protective knob unit for use on rotatable shafts to prevent overload torque from being applied to the shaft and damaging any means connected to the shaft.

There has long been a need for a satisfactory protective knob which could be readily secured to a shaft of an instrument, for example, without the necessity of modifying the shaft and which will prevent the operator from damaging the instrument in the event of the jamming of moving parts of the instrument connected to the shaft.

It is an object of the present invention to provide a knob unit which is simple to construct, easy to install and operate and which will prevent excess torque from being applied to the shaft.

A feature of the invention resides in the novel construction wherein the maximum torque transmitted by the knob to the shaft can be adjusted.

Another feature of the invention resides in the novel construction wherein a standard basic unit is provided to which knobs of various configurations may be readily applied.

A still further feature of the invention resides in the novel knob construction wherein the adjusting means for varying the torque transmitted by the knob is accessible from the exterior of the knob through a combined closure and connector for connecting the knob to the unit.

Other features and advantages of the invention will be apparent from the specification and claims when considered in connection with the accompanying drawings in which:

Figure 1 shows the knob applied to a shaft projecting from an instrument panel of a suitable instrument.

Fig. 2 is an enlarged sectional view taken along lines 2—2 of Fig. 1.

Fig. 3 is a sectional view taken along lines 3—3 of Fig. 2.

As shown in the drawings, an instrument 10 is provided with a front panel 11 through which projects shaft 12 which may be secured in position in the panel by means of the usual coupling 13. Secured to the projecting end of the shaft is a protective knob unit 14 of the present invention. This comprises a standard basic unit to which knobs of required outer configuration may be applied. The basic unit consists of a sleeve 15 adapted to have the shaft 12 inserted in the longitudinal bore 16 thereof. The sleeve has an end wall 17, herein illustrated as a closed end, overlying the end of the shaft.

While the sleeve may be secured by any suitable means to the shaft for rotation therewith, it is herein illustrated as being secured by means of a set screw 18 threaded in the sleeve and bearing against the shaft.

Surrounding the sleeve is a bushing 19 which is rotatably mounted on the sleeve and is provided with an end flange 20 overlying and engaging the end wall of the sleeve. The sleeve and bushing are secured in assembled relation to form the unit by means of a spring washer 21 of usual construction snapped into a groove 22 in the bushing and overlying a shoulder 23 formed adjacent the end of the sleeve opposite the end wall 17.

In order to effect a releasable driving connection between the sleeve and the bushing, the present invention provides a transverse bore 24 in the end wall of the sleeve in which is mounted a ball 25 which is urged to project beyond one end of the bore by means of a spring 26. For cooperating with the ball there are formed in the bushing a plurality of ball-receiving recesses in spaced relation around the bushing and in line with the end of the bore. In the illustrated form of the invention the recesses are formed by holes 27 drilled through or otherwise formed in the bushing, the holes being of a diameter less than the diameter of the ball so that only a portion of the ball is received therein, as shown in Figs. 2 and 3, and forms the driving connections between the sleeve and bushing. Upon abnormal torque being applied to the sleeve, however, the ball will be depressed against the spring and release the driving connection. If desired, the amount of torque necessary to release the drive can be adjusted by means of a screw 28 threaded in the bore and engaging the spring to vary the pressure of the spring forcing the ball into the recess.

In order to facilitate operation of the bushing and the sleeve unit, a knob member 29 is slidably mounted over the bushing and is keyed thereto for rotation therewith. As herein illustrated, the key is in the form of a set screw 30 threaded in the knob and having its end 31 seated in one of the apertures in the bushing as shown in Figs. 2 and 3. This permits knobs of various external contours, as may be required for the particular instrument, to be assembled with the standard basic unit. With this particular construction the set screw 30 performs an additional function of being a removable closure through which access is afforded for a screw driver or suitable tool (not shown) to be inserted into driving engagement with the adjusting screw 28 for the spring so that the release torque can be varied. However, when the set screw is threaded into place in the knob, it conceals the adjusting means and reduces the tendency for unauthorized adjustments of the torque.

If desired, the bushing and knob can be provided with aligned opens 32, 33 which, when the bushing and knob are locked in position, align with the set screw 18 for the sleeve to permit the protective knob unit to be installed or released from the shaft as an assembled unit if desired.

It will be seen, therefore, that the present invention provides a simple, yet effective protective knob unit which can be readily manufactured and installed at low cost since the standard basic units can be manufactured in large quantities and thus reduce manufacturing costs and they can be adapted for particular instruments by the application of a knob having the exterior configuration required by the instrument. Furthermore, they can be installed without requiring any modification of the shaft to which they are applied.

The device of the present invention has a novel adjusting means for varying the torque and wherein the means for connecting the knob to the standard unit serves to provide access to said adjusting means and to form a concealing closure for said access opening to prevent unintentional tampering with the adjustment.

Variations and modifications may be made within the scope of the claims and portions of the improvements may be used without others.

I claim:

1. A protective knob unit for use on shafts of instruments comprising a sleeve having a bore to receive the end of a shaft and having an end wall; a bushing rotatably mounted on the sleeve and having an inturned flange engaging the end wall of the sleeve and means to prevent separation of said sleeve and bushing, said end wall having a transverse bore therethrough and said bushing having a plurality of recesses therein in position to be aligned with said transverse bore; a spring-pressed ball in the transverse bore adapted to have a portion thereof urged into one of said recesses to form a releasable driving connection between said sleeve and bushing; and a knob disposed over the bushing and having means to lock the knob and bushing together for rotation.

2. A protective knob unit for use on shafts of instruments comprising a basic unit including a sleeve having a bore to receive the end of a shaft and having an end wall; means for securing the sleeve to the shaft to rotate therewith; a bushing rotatably mounted on the sleeve and having an inturned flange engaging the end wall of the sleeve and means to prevent separation of said sleeve and bushing, said end wall having a transverse bore therethrough and said bushing having a plurality of apertures therein in position to be aligned with said transverse bore; a spring-pressed ball of larger diameter than said apertures disposed in the transverse bore adapted to have a portion thereof urged into one of said apertures to form a releasable driving connection between said sleeve and bushing; and a knob slidable over the bushing and having a set screw threaded therein and engaging one of said apertures in the bushing to lock the knob and bushing together for rotation whereby knobs having different outer configurations can be readily applied to the basic unit.

3. A protective knob unit for use on shafts of instruments comprising a basic unit including a sleeve having a bore to receive the end of a shaft and having a closed end wall; a bushing rotatably mounted on the sleeve and having an inturned flange engaging the end wall of the sleeve and having a groove within the bushing to receive a spring fastener to overlie a shoulder on the sleeve to prevent separation of said sleeve and bushing, said end wall having a transverse bore therethrough and said bushing having a plurality of spaced apertures therein in position to be aligned with said transverse bore; a ball in the transverse bore; a spring in said bore engaging said ball and urging a portion of said ball into one of said apertures to form a releasable driving connection between said sleeve and bushing; an adjusting screw threaded in the bore to vary the pressure of the spring against the ball; and a knob having a predetermined exterior configuration slidable over the bushing and having a connecting means in the knob and engaging one of said apertures to lock the knob and bushing together for rotation, the removal of the connecting means providing an access opening adapted to permit a tool to be inserted to adjust said adjusting screw to vary the pressure required to release the ball from the aperture and break the driving connection between the bushing and sleeve.

4. A protective knob unit for use on shafts of instruments comprising a sleeve having a bore to receive the end of a shaft and having a closed end wall; a bushing rotatably mounted on the sleeve and having an inturned flange engaging the end wall of the sleeve and means to prevent separation of said sleeve and bushing, said end wall having a transverse bore therethrough and said bushing having a plurality of diametrically disposed apertures therein in position to be aligned with said transverse bore; a ball in the transverse bore having a diameter greater than the diameter of said aperatures; a spring in said bore engaging said ball and urging a portion of said ball into one of said apertures to form a releasable driving connection between said sleeve and bushing; an adjusting screw threaded in the bore to vary the pressure of the spring against the ball; and a knob slidable over the bushing and having a set screw threaded in the knob and engaging one of said apertures to lock the knob and bushing together for rotation, the removal of the set screw providing an access opening adapted to permit a tool to be inserted to adjust said adjusting screw to vary the pressure required to release the ball from the aperture and break the driving connection between the bushing and sleeve.

References Cited in the file of this patent
UNITED STATES PATENTS

| | | |
|---|---|---|
| 1,111,990 | Braun | Sept. 29, 1914 |
| 1,611,940 | Ohmer | Dec. 28, 1926 |
| 2,311,230 | Hill | Feb. 16, 1943 |
| 2,373,812 | Coop | Apr. 17, 1945 |
| 2,401,992 | Waller | June 11, 1946 |
| 2,502,915 | Atkins et al. | Apr. 4, 1950 |
| 2,634,650 | Coop | Apr. 14, 1953 |
| 2,660,904 | Hilsinger | Dec. 1, 1953 |
| 2,826,107 | Woods | Mar. 11, 1958 |
| 2,881,602 | Baker et al. | Apr. 14, 1959 |
| 2,885,918 | Allimann | May 12, 1959 |